United States Patent [19]

Blanchard et al.

[11] Patent Number: 4,605,323
[45] Date of Patent: Aug. 12, 1986

[54] DUAL QUALITY WIRE MATRIX PRINT HEAD

[75] Inventors: Robert C. Blanchard, Glendale, Ariz.; David G. Geis, Niles, Ill.

[73] Assignee: AT&T Teletype Corporation, Skokie, Ill.

[21] Appl. No.: 751,358

[22] Filed: Jul. 2, 1985

[51] Int. Cl.⁴ ............................................. B41J 3/02
[52] U.S. Cl. .................................. 400/124; 101/93.05
[58] Field of Search ...................... 400/124; 101/93.05

[56] References Cited

U.S. PATENT DOCUMENTS

| 4,010,835 | 3/1977 | Martin et al. | 400/124 |
| 4,400,101 | 8/1983 | Hendrischk | 400/124 |
| 4,459,051 | 7/1984 | Kawai | 400/124 |

FOREIGN PATENT DOCUMENTS

| 56-4771 | 1/1981 | Japan | 400/124 |
| 58-163670 | 9/1983 | Japan | 400/124 |

Primary Examiner—Edgar S. Burr
Assistant Examiner—David A. Wiecking
Attorney, Agent, or Firm—A. A. Tirva

[57] ABSTRACT

A wire matrix print head movable along a print line has a pair of guides containing print wires arranged in two parallel columns. Horizontally movable sloped platforms are provided for moving the guides vertically relative to each other so as to change the alignment of the wires in one guide with those in the other guide, thereby changing high speed mode of printing to high quality mode, and vice-versa.

8 Claims, 5 Drawing Figures

DUAL QUALITY WIRE MATRIX PRINT HEAD

TECHNICAL FIELD

This invention relates to wire matrix print heads and, more particularly, to print heads having a plurality of print wires aligned in separate vertical columns.

BACKGROUND OF THE INVENTION

Wire matrix printers utilizing multiple columns of print wires which may be selectively positioned to provide either high or near letter quality printing mode or high speed or data quality printing mode are well known in the art. Various means of positioning the columns is disclosed in U.S. Pat. Nos. 4,010,835; 4,400,101; and 4,470,713.

When print wires in one column are aligned with the corresponding wires in another column, high speed or data quality printing is obtained since it is possible to double the number of dots or points imprinted by the wires on the same line per unit of time as compared with imprints produced by a single column of prints wires.

When the print wires in one column are staggered in relationship to the wires in another column, the printing speed remains the same as if there was only a single column of wires, but the quality of printing is substantially improved over the high speed or data printing mode since it is possible to obtain overlaps of the dots or points imprinted by the wires thereby producing an improved appearance since the overlapping dots create a substantially continuous line of printing.

While the above identified Letters Patent provide various devices for shifting the print wires in different columns from high speed to high quality mode, and vice-versa, none of them discloses a simple, convenient device, having but a few parts, for on line shifting from one mode to the other employing minimum of movement and thereby greatly reducing the wear on the print wires.

DISCLOSURE OF THE INVENTION

In accordance with the present invention, we provide a wire matrix print head with a pair of wire guides, each of which has a plurality of vertically aligned print wires. The printing ends of the wires are thus disposed in two different vertical columnar alignments with respect to the paper on which printing is to be performed.

The guides are positioned above a common platform which is formed with two inclined surfaces or ramps on top thereof, each surface being inclined in the opposite direction from the other. The platform with the inclined surfaces is operatively connected to a solenoid, or the like, for imparting horizontal movement to the platform in a direction toward or away from the paper on which printing is to be done. As the forward or reverse horizontal movement of the platform takes place, the wire guides ride up or down the inclined surfaces, thus changing the vertical alignment relationship between the wires in the two guides.

In one arrangement, the corresponding print wires in two guides are arranged in such a manner that the dot imprinting made by the corresponding wires positioned in two guides overlap each other so that the printing forms a substantially solid line. When the print wire guides are moved to align the corresponding wires in the two guides eliminating the overlaps, then imprinting produces spaces between the dots, thus presenting the high speed or data quality mode of printing which is less eye appealing than the former.

The present invention overcomes the disadvantages known in the art and provides a device containing a few parts, which is easily operable for on line shifting from one printing mode to another, and holds the print wire guide travel to a minimum, thereby substantially reducing friction and wear of the print wires.

THE DRAWINGS

It will be understood that, for purposes of clarity, certain elements may have been intentionally omitted from certain views where they are believed to be illustrated to better advantage in other views or do not form an essential part of this invention.

DETAILED DESCRIPTION

Figure 1:
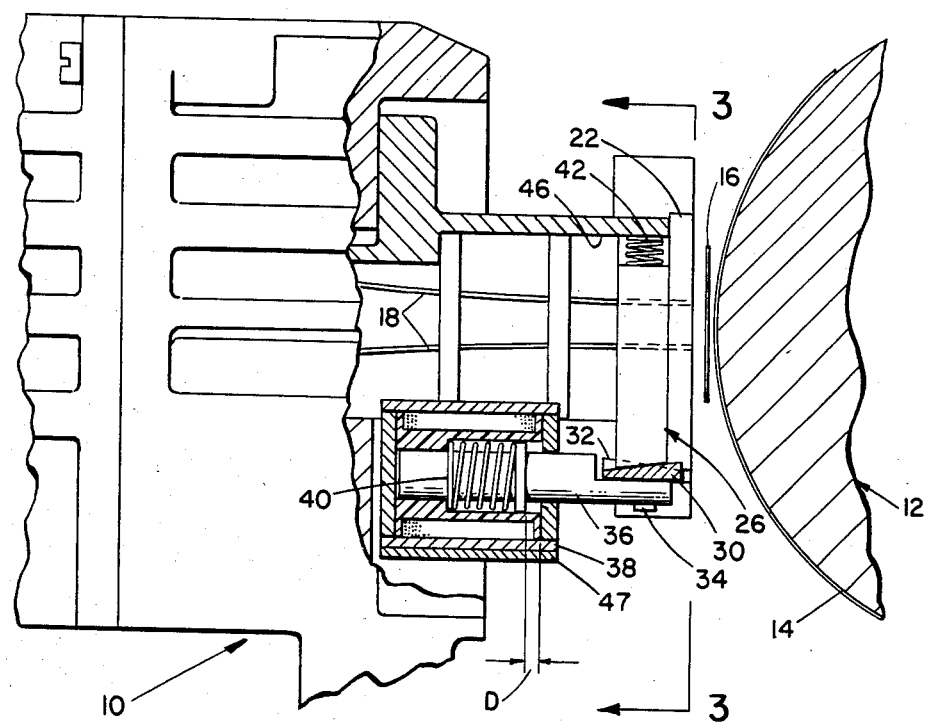
FIG. 1 is a fragmentary side elevational view, partially broken away, showing the print head of the present invention.

Referring now to the drawing for better understanding of the present invention, more particularly to FIG. 1, there is shown a print head, generally designated 10, positioned in front of a printer roller or platen 12 which has a sheet of paper 14 positioned thereon for receiving imprints from the print head. A printer ribbon 16 is interposed between the print head and the paper 14. It will be understood that the print head is moveable along the line of print.

Figure 2:
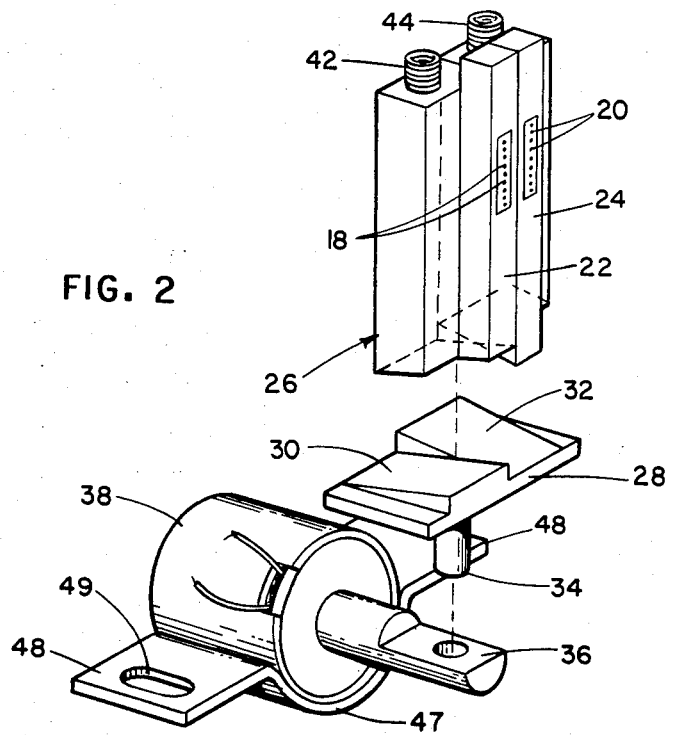
FIG. 2 is an exploded perspective view of a portion of the structure illustrated in FIG. 1.
Figure 3:
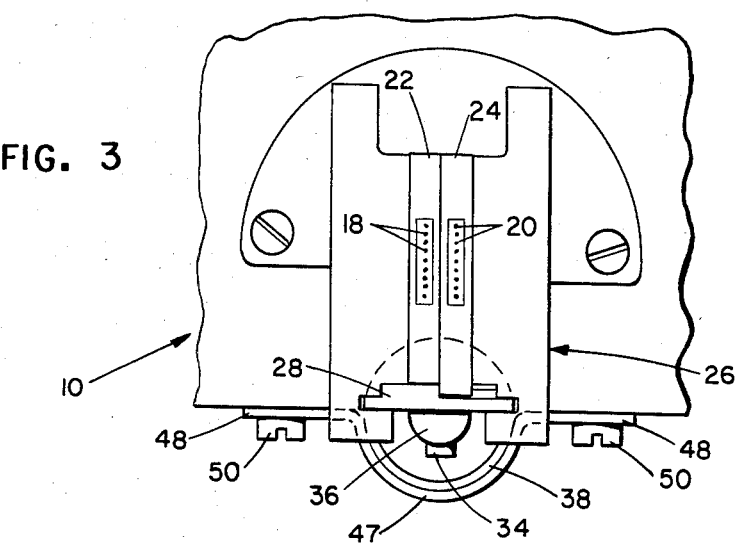
FIG. 3 is an end elevational view taken generally along the line 3—3 of FIG. 1.

The print head 10 has a plurality of print wires 18 and 20 positioned in wire guides 22 and 24 respectively, and extending therethrough. The wire guides are secured to a guide housing 26, as best seen in FIG. 2.

A platform 28 presents on its top a pair of upwardly facing inclined surfaces or ramps 30 and 32, which are inclined in opposite directions.

When the structure is assembled, the inclined surface 30 is positioned beneath the wire guide 22, while the surface 32 is located beneath the wire guide 24. A pin 34 connects the platform 28 to a plunger 36 extending from a solenoid 38, or the like which, as best seen in FIG. 1, is provided with an internal spring 40 to retract the plunger 36 when the solenoid 38 is de-energized.

Springs 42 and 44 located on the top of the housing 26 are interposed between the top of the housing and a bar 46 of the print head 10 to exert downwardly directed pressure on the guides 22 and 24, respectively, to retain them on the platform 28.

In operation of the device, printing is produced by the impact of selected plurality of print wires 18 and 20, each of which has an electromagnetic actuator (not shown), or the like, well known in the art and so arranged that when a selected actuator is energized, the associated print wire is driven forward towards the platen 12 to impact the ribbon 16 and the paper 14. The impact of the print wire on the ribbon and paper forms a dot or point at a selected location on the paper 14.

To provide different alignments between the wires 18 and 20, the guides 22 and 24 are moved vertically, so that one guide moves up a distance equal to ¼ of a dot while the other guide moves a like distance down.

Vertical motion of the guides 22 and 24 takes place when the solenoid 38 is energized, thereby moving the plunger 36 backwards away from the platen 12. The plunger 36, in turn, moves the platform 28 a pre-determined distance along a horizontal line normal to the major axis of the platen 12. Movement of the platform 28 in the horizontal direction causes the guides 22 and 24 to slide up or down their respective inclined surfaces 30 and 32, and thus move in a vertical direction providing a change in the alignment between the print wires 18 and 20.

The solenoid 38 is firmly fastened to a bracket 47 by means of spot welding or bonding with an epoxy type glue. The bracket 47 has two tabs 48 extending away from the solenoid 38, each tab 48 having an elongated hole 49 with the major axis of each hole being substantially parallel to the path of travel of solenoid plunger 36. The solenoid 38 is mounted on the print head 10 by passing a screw 50 through each hole 49. The elongated holes 49 permit movement of the solenoid 38 toward and away from the platen 12. This movement of the solenoid 38 will in turn cause movement of the platform 28 and thus result in movement of guides 22 and 24, enabling vertical alignment of wires 18 with wires 20 without requiring maintenance of tight tolerances in the manufacture of the platform 28 and guides 22 and 24. The movement permitted by the mounting arrangement of the solenoid 38 may also be utilized to establish an initial vertical displacement between the two adjacent sets of print wires 18 and 20.

The horizontal movement of the platform 28 in response to the movement of the solenoid plunger 36 is approximately in a 10:1 ratio to the vertical movement of the guides 22 and 24. Displacement of the plunger 36 through a distance "D" as shown in FIG. 1 facilitates accurate displacement of the wires 18 of guide 22 relative to the wires 20 of guide 24 to produce high quality printing.

Figure 4:
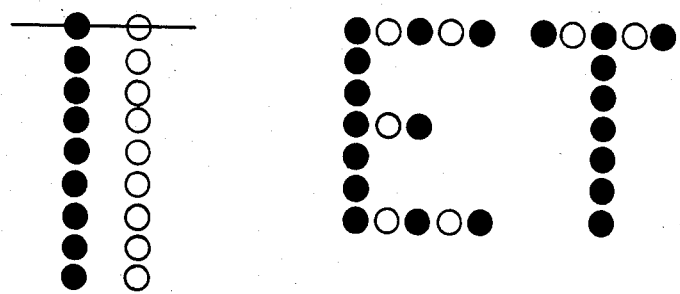
FIG. 4 is a view illustrating spaced arrangement of printing impressions producing high speed or data quality mode of printing.

When the solenoid 38 is de-energized, the internal spring 40 returns and keeps the platform 28 in its initial position closest to the platen 12; and the print wires located in one guide are in alignment with the corresponding print wires in the other guide producing high speed or data quality printing shown in FIG. 4.

Figure 5:
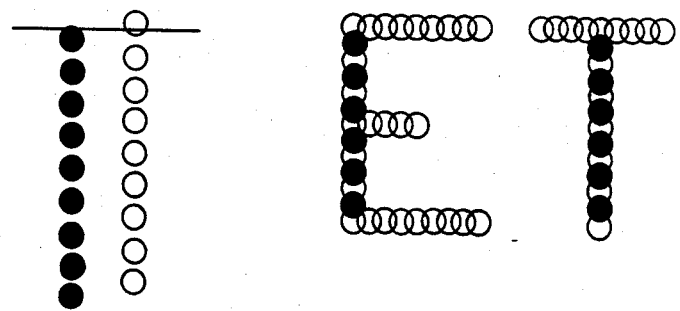
FIG. 5 is a view illustrating overlapped arrangement of printing impressions producing high quality or near letter mode of printing.

When the solenoid 38 is energized, as described hereinabove, the horizontal movement of the platform 28 results in vertical movement of guides 22 and 24 and the wires 18 and 20 are displaced vertically to produce high quality or near letter mode of printing, as illustrated in FIG. 5.

What is claimed is:

1. A print head for a wire matrix printer, said print head being laterally movable in the direction of printing, comprising:
   a pair of wire guides positioned in adjacent, parallel, vertical relationship;
   each of said guides having a plurality of print wires extending therefrom in vertical alignment with each other within the respective guide;
   means for effecting the simultaneous selected vertical movement of said guides, including:
   a horizontally moveable platform positioned beneath corresponding ends of said guides in contacting relationship therewith;
   said platform presenting a pair of inclined surfaces on the top thereof sloping in opposite directions; and
   means operatively connected to said platform for moving said platform in a horizontal direction to thereby effect simultaneous selected vertical movement of said guides.

2. A print head for a wire matrix printer, said print head being moveable in the direction of printing, comprising:
   a pair of wire guides positioned in parallel relationship;
   each of said guides having a plurality of print wires extending therefrom in alignment with each other within the respective guide;
   means for effecting the simultaneous selected axial movement of said guides in opposite directions, including:
   a moveable platform positioned adjacent corresponding ends of said guides in contacting relationship therewith;
   said platform presenting a pair of inclined surfaces thereon sloping in opposite directions; and
   means operatively connected to said platform for moving said platform horizontally to thereby effect simultaneous selected axial movement of said guides.

3. A print head as defined in claim 1, wherein said inclined surfaces are on the top of said platform.

4. A print head as defined in claim 1, wherein the ratio of horizontal movement of said platform to the vertical movement of said guides is 10 to 1.

5. A print head as defined in claim 1, wherein said moving means includes a solenoid.

6. A print head as defined in claim 2, further comprising means for mounting said moving means adjustable in said direction normal to the vertical axes of said guides.

7. A print head for a wire matrix printer, said print head being laterally moveable in the direction of printing, comprising:
   a pair of wire guides positioned in adjacent, parallel, vertical relationship;
   each of said guides having a plurality of print wires extending therefrom in vertical alignment with each other within the respective guide;
   means for effecting the simultaneous selected vertical movement of said guides in opposite directions, including:
   a horizontally movable platform positioned beneath corresponding ends of said guides in contacting relationship therewith;
   said platform presenting a pair of inclined surfaces on the top thereof sloping in opposite directions; and
   a solenoid operatively connected to said horizontally moveable platform for moving the same.

8. A print head as defined in claim 7 further comprising means for mounting said solenoid adjustable in said horizontal direction.

* * * * *